United States Patent [19]    [11] 4,256,583
Lennartz    [45] Mar. 17, 1981

[54] FLUSH-BACK FILTER

[75] Inventor: Rudiger Lennartz, Pulheim, Fed. Rep. of Germany

[73] Assignee: Boll & Kirch Filterbau GmbH, Cologne, Fed. Rep. of Germany

[21] Appl. No.: 74,154

[22] Filed: Sep. 10, 1979

[30] Foreign Application Priority Data

Oct. 19, 1978 [DE] Fed. Rep. of Germany ... 7831128[U]

[51] Int. Cl.³ .............................................. B01D 29/38
[52] U.S. Cl. .................................. 210/333.1; 210/340
[58] Field of Search .................... 210/333.1, 334, 340, 210/341

[56] References Cited

U.S. PATENT DOCUMENTS

| 2,679,320 | 5/1954 | Walton | 210/340 |
| 4,035,295 | 7/1977 | Plueqult | 210/341 X |

FOREIGN PATENT DOCUMENTS 1801441 6/1970 Fed. Rep. of Germany .
207588 11/1923 United Kingdom ..................... 210/340

Primary Examiner—John Adee
Attorney, Agent, or Firm—Meyer, Tilberry & Body

[57] ABSTRACT

A flush-back filter which is compact in size, simple to mount, maintain and clean. The filter consists of two side by side filter chambers, a rotary valve arranged in a housing underneath, and a piston valve slidable in the rotary valve for controlling the flow of fluid to and from the filter chambers and the discharge of any filtered out sludges.

9 Claims, 3 Drawing Figures

FLUSH-BACK FILTER

This invention pertains to the art of filters and more particularly to a filter apparatus consisting of two filter chambers arranged in upright position next to each other, a rotary valve arranged in a housing for the alternating engagement and disengagement of the filter chambers and a piston valve arranged in the rotary valve with a valve-closing element for the sludge drainage, by the operation of which a flush-back medium is deliverable to the filter chamber disengaged at the time, in which set-up the connections for the supply of the medium to be filtered, for the withdrawal of the filtrate as well as for the discharge of the flush-back sludge, are arranged on the rotary valve housing carrying the filter chambers.

BACKGROUND OF THE INVENTION

Filtering devices of this kind of construction are known from German laid-open patent application DE-AS No. 18 01 441 and are used for filtering liquids, preferably oil and the like. They have proved their worth in practice. The known filter apparatuses have, however, relatively large constructional dimensions. They require, therefore, correspondingly large mounting spaces which are, however, not frequently available in practice. On account of the large constructional dimensions and the relatively complicated construction of these filtering devices, large inner flow routes result which are disadvantageous in regard to the internal pressure losses as well as in regard to the susceptibility of fouling of the devices. Furthermore, difficult conditions for the maintenance and the cleaning of these filtering devices result from this kind of construction.

Efforts for a long time in the filter technology have been made to produce filtering devices of the smallest possible constructional dimensions and to design them in such a way that mounting, maintenance and cleaning of these devices is rendered as simple as possible. However, such efforts have not succeeded in producing a flush-back filter of the aforementioned construction which fully meets all these requirements. It is therefore the task of the invention to improve particularly the flush-back filter known from the the DE-AS No. 18 01 441, the disclosure of which is incorporated herein by reference, in such a way that it can be manufactured with considerably smaller overall dimensions. The filter apparatus has to meet at the same time also the other requirements mentioned above, like the simplest possible mounting, maintenance and cleaning.

THE INVENTION

This problem is solved according to the invention in that the rotary valve is arranged underneath the two filter chambers in a horizontal position in such a way that its axis runs at right angles to the axis of the two filter chambers, in which arrangement the rotary valve housing forms a pedestal for the filter chambers standing on it; and, that the aforementioned connections lie in the horizontal plane of the rotary valve housing. Preferably in this arrangement the top surface of the rotary valve housing is constructed as a mounting base from which the inner channels leading to the two filter chambers open out and on which the two filter chambers are detachably fastened e.g. by threaded bolts or other fastening means.

In this constuction of the filter apparatus, therefore, only two filter chambers are provided, one of which is always set for filter operation and the other for flush-back operation. Each of the two filter chambers is in this arrangement dimensioned for the full filter-throughput capacity. The rotary valve housing forms the base or the pedestal part respectively on which the two filter chambers standing next to each other are supported. The horizontal arrangement of the rotary valve makes it possible to build the rotary valve housing relatively flat, whereby a considerable reduction of the overall height results. An additional reduction of the overall height is achieved by positioning all connections of the rotary valve housing, for instance consisting of flanged pipe joints or the like, in the same horizontal plane. There is no need to provide a separate base part of the housing, which like provided in the DE-AS No. 18 01 441, must be attached to the bottom of the rotary valve housing proper and contains the connections for the supply of the medium to be filtered and for the dispensing of the sludge discharge. In the filter apparatus according to the invention, the mentioned connections preferably lie in a common horizontal plane which preferably coincides with the plane of the rotary valve axis. There exists, however, also the possibility to offset slightly the horizontal connections in the vertical plane against each other. In any case it is advisable to arrange the connections for the supply of the medium to be filtered and for the withdrawal of the filtrate in parallel side by side relationship in a common horizontal plane. Such an arrangement results in especially short hydraulic connecting paths which are moreover relatively easily accessible for the purpose of cleaning.

The use of only two filter chambers which are standing closely spaced in parallel relationship on the rotary valve housing leads also to small width dimensions of the filter apparatus according to the invention. In this respect, it is advantageous if both filter chambers have an approximately elliptical or oval cross-section, in which case they are arranged in side by side relationship on the rotary valve housing in such a way that the longitudinal axes of the elliptical or oval cross-sections are parallel to each other. The reduction of the overall width of the construction is of further value in that the two filter chambers stand on the top surface of the rotary valve housing and in that therefore no separate elbow pieces or the like have to be used for the connection of the filter chambers with the rotary valve housing, as is for instance the case in the filter apparatus according to the DE-AS No. 18 01 441 patent application. Altogether, it is therefore possible to build the filter apparatus according to the invention without reduction of the hydraulic internal cross-sectional area and so compact that its space requirement is up to 50% smaller than that of the known filter apparatus.

The comparatively small constructional dimensions of the filter apparatus according to the invention lead also to shorter internal hydraulic connecting channels, so that correspondingly the internal pressure losses are reduced, the susceptibility of fouling is diminished and the possibility of cleaning the filter apparatus is improved. The hydraulic cross-sections can in this case be dimensioned sufficiently large that the internal channels are easily accessible for the purpose of cleaning. Moreover, considerable constructional simplifications result, since, above all, the connecting parts with additional gaskets and screw couplings and the like can be eliminated which would be otherwise required for the connection of the filter chambers on the rotary slide valve housing. The use of only two filter chambers which are alternately set for filter operation leads likewise to constructional simplification as well as to advantages with regard to the mounting and the maintenance of the filter apparatus. Another resulting advantage is that for changing over the rotary valve relatively small movements of the controls are requuired which amount for instance to 100° to 120°. Consequently, it is possible to use simple and compact control devices for the operation of the rotary valve. Preferably for this purpose there is provided a short-stroke control cylinder which is likewise supported on the top surface of the rotary valve housing and which by means of a simple mechanical coupling, for instance a lever gear, or by means of a rack-and-pinion gear as drive mechanism, is coupled with the rotary valve.

A further constructional simplification is attainable according to the invention if the valve seat of the sludge discharge valve is integrally connected with the rotary valve. By this arrangement the rotary valve is mounted by the sludge valve seat in the rotary valve housing. The sludge valve closing element is also movably supported in the rotary valve. With this measure rotation of the rotary valve does not result in rotation of the sludge valve-closing element relating to its valve seat, which would lead to wear of these parts.

In a further preferred constructional development, an insert part is fastened on the side of the rotary-valve housing opposite the sludge outlet and dipping into it which forms a pressure reservoir for the pneumatic flush-back medium as well as a cylinder space inside the pressure reservoir in which the piston of the piston rotary valve is guided. In such an arrangement the rotary valve can have its second pivot bearing set up on this insert piece.

In spite of the relatively short lengths of the internal channels, large distances for acceleration of the flush-back fluid required for an efficient flush-back of the filter are attainable. In this respect it is advantageous, when filter cartridges are used as filter elements, for air-vent valves associated with the filter chambers to be arranged in such a way that they are spaced a distance of at least 10 mm, preferably 10 to 100 mm, underneath the upper end of the filter cartridges. In this case the liquid level in the filter chamber to be back-flushed can sink to a point which lies at a distance underneath the upper end of the filter cartridges when the rotary valve is rotated to the flush-back position. Correspondingly, a free acceleration space is formed in the interior of the filter chambers into which the liquid column driven by compressed air can be rushed. By this arrangement acceleration space continues above the filter cartridges into the top area of the filter chambers. It becomes evident that the flush-back effect can be considerably increased with these measures, so that the service life of the filters can be lengthened or the available filter area can be reduced with the same service life, which leads likewise to a reduction in the constructional dimensions of the filter apparatus.

As mentioned, filter inserts are appropriately used as filter cartridges. Moreover, according to the invention, all other characteristics in a filter apparatus which are essential for the mode of operation of the filter apparatus can be realized.

OBJECTS OF THE INVENTION

The principal object of the invention is the provision of a new and improved flush-back filter apparatus which for a given capacity is compact in size, easily mounted, easily maintained, and easily cleaned.

Another object of the invention is the provision of a new and improved flush-back filter comprised of a pair of flush-back chambers wherein a rotary valve is employed having an axis transverse to the axes of the chambers to provide a filter of minimum overall vertical height.

A further object is the provision of a flush-back filter wherein the inlet, outlet, and sludge discharge openings are all in the same horizontal plane.

A further object of the invention is the provision of a new and improved flush-back filter having a rotary valve for switching the flow of fluids between chambers and a piston valve slidably mounted in the rotary valve for controlling the flushing out of the filter chamber not then performing a filtering operation.

A further object of the invention is the provision of a new and improved multi-chamber flush-back filter wherein the sludge back valve closing element and its valve seat are each mounted on and rotate with the rotary switchover valve whereby to avoid wear caused by rotation of the rotary valve.

A further object of the invention is the provision of a new and improved flush-back filter wherein means are provided for accelerating the flow of fluids through the filter not in operation for improving the cleaning out of such filter.

A further object of the invention is the provision of means for maintaining an air space in the top of the filter chambers whereby rapid initial flow of flushing fluids through the filters is encouraged.

DRAWINGS

The invention may take physical form in certain parts and arrangement of parts, a preferred embodiment of which will be described in detail in the specification and illustrated in the accompanying drawings which form a part hereof and wherein.

PREFERRED EMBODIMENT

Figure 3:
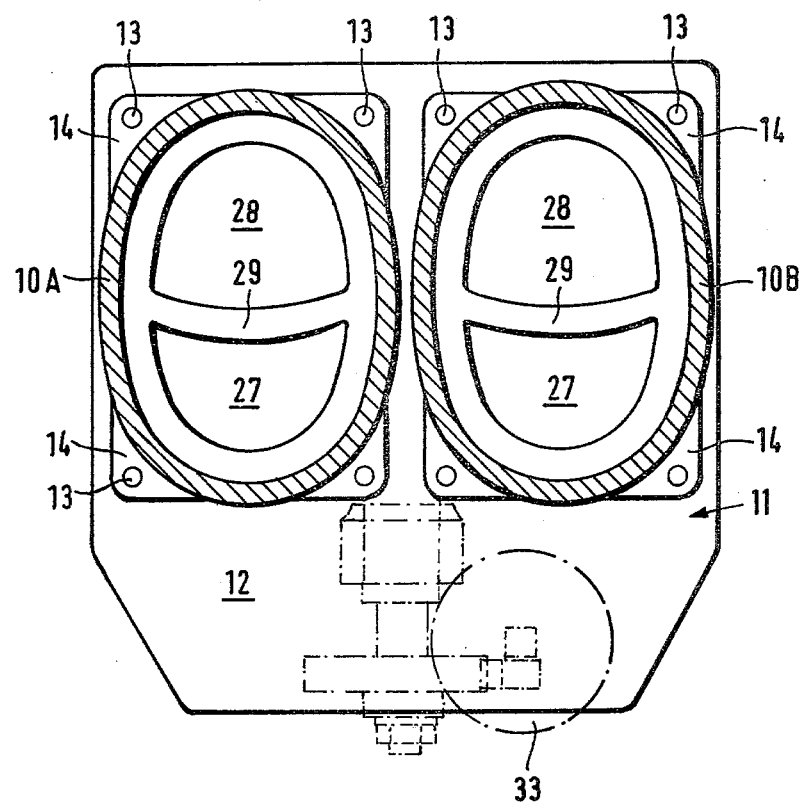
FIG. 3 is a cross-section following the line III—III of FIG. 1.

Rerferring now to the drawings wherein the showings are for the purpose of illustrating a preferred embodiment and not for the purposes of limiting same, the displayed filter apparatus has two filter chambers 10A and 10B standing closely spaced in parallel side-by-side relationship which chambers are of identical construction and supported by a rotary valve housing 11 which thus forms the base for the two filter chambers 10A and 10B. The top surface 12 of the rotary valve housing 11 forms a mounting surface for the connection of the filter chambers 10A and 10B which in upright position, i.e. with the longitudinal axis vertical, are fastened on the rotary valve housing 11. The detachable fastening of the filter chambers 10A and 10B takes place by means of screws 13 which engage screw holes on flange-like shoulders 14 of the filter chambers and screwed into tapped holes on the upper flange-like mounting base 12 of the rotary valve housing 11. As shown in FIG. 3, the two filter chambers 10A and 10B always have an approximately elliptical or oval cross-section. They are at the same time aligned relative to each other in such a way that the longitudinal axes of the elliptical or oval cross-sections are in parallel with each other. Consequently the two filter chambers 10A and 10B can be arranged on the mounting surface 12 in upright position with the narrowest possible overall width of the filter apparatus.

Each filter chamber 10A and 10B has a plurality of filter cartridges 15 as filter inserts which rest with their lower ends on a common support plate 16 fastened on the lower end of the filter chamber opening against the mounting base 12. The support plate 16 is provided with openings 17 for the passage of the filtrate. The upper, closed ends 15' of the vertically set up filter cartridges 15 lie at a distance from the upper closed end 10' of the two filter chambers 10A and 10B, so that here a compression space 18 exists in the filter chambers above the filter cartridges, the importance of which will be explained in more detail hereinafter.

The rotary valve housing 11 has three connections 19, 20, and 21, which consist in each case of a flanged coupling connected integral with the rotary valve housing 11 and which lie in a common horizontal plane, in which set-up the connections 19 and 20 are arranged in parallel side-by-side relationship, whereas the connection 21 is arranged offset in the horizontal plane by 90° on the rotary valve housing. The connection 19 serves for supplying the liquid medium to be filtered, whereas the filtrate is discharged by way of the connection 20 and the filtered-out sludge by way of the connection 21.

A rotary valve 22 is arranged in a cylindrical inner borehole of the rotary valve housing 11 which valve is supported at 23 and 24 on the cylindrical inner wall of the rotary valve bore and can be sealed against this wall for instance by means of 0-gaskets. The rotary valve 22 corresponds essentially to that according to the DE-AS No. 18 01 441 application. The axis of rotation of the rotary valve 22 runs horizontally, therefore perpendicularly to the longitudinal axis of the two filter chambers 10A and 10B. The rotary valve 22 is thus located in a horizontal position underneath two filter chambers 10A and 10B, whereby a particularly low type of construction of the filter apparatus results. The axis of the rotary valve 22 coincides with the central axis of the connection 21 for the sludge discharge.

The rotary valve 22 subdivides the rotary valve bore into two approximately annular chambers 25 and 26, one of which, 25, is connected with the connection 20 for the withdrawal of the filtered liquid, whereas the other 26 is connected with the connection 19 for the supply of the liquid to be filtered. On both sides of the inner bore receiving the rotary valve 22, two essentially vertical channels 27 and 28 are arranged in the rotary valve housing 11 which by way of a cross connection (not displayed) underneath the cylindrical web wall 28' are in communication with the chambers 25, 26. The channels 27 and 28 are in each case separated from each other by means of a wall or cross piece 29. They open into the top of the mounting base 12 respectively of the rotary valve housing 11. By a comparison of the FIGS. 2 and 3, it can be recognized that the cross-sectional shapes of the channels 27, 28 change in their vertical course in that the channels 27 have at their opening on the mounting base 12, an approximately segmental or sickle-shaped cross-section, whereas the channels 28 open into the mounting base with a cross-section in the shape of an oval or a semi-oval. The shapes change in such a way that the cross-sectional areas of the channels 27, 28 remain essentially constant over their entire length. The channels 28 form the intake to the filter chambers 10A and 10B, whereas the channels 27 are connected by way of the openings 17 of the supporting plate 16 with the interiors of the filter cartridges and thus serve for the withdrawal of the filtered liquids from the filter chambers.

The rotary valve 22 protrudes on the side opposite the sludge discharge 21 from the rotary valve housing 11, in which arrangement it carries on its end 30 lying on the outside, a pinion 31 which is meshed with a gear rack 32. The back and forth motion of the gear rack 32 accordingly imparts to the rotary valve 22 by way of the gear wheel 31, a rotary motion in one or the other direction, whereby the filter chambers 10A and 10B are alternately set for filtering operation or for flush-back. The drive of the rotary valve 22 by way of the gear rack 32 takes place by means of a short-stroke hydraulic or pneumatic control cylinder 33 which is likewise fastened in upright position on the rotary valve housing 11. On the mounting base 12 of the rotary valve 22 is arranged for this purpose a support bracket 34 on which rests the cylinder 33. The gear rack 32 is connected with the piston rod 35 of the control cylinder 33 so that with the outstroke of the cylinder 33, the rotary valve 22 performs a clockwise rotary motion and with the instroke of the piston rod, a counterclockwise rotary motion. Since the entire control path of the rotary valve 22 encompasses a angle of rotation of about 100° to 120° only, a correspondingly compact, short-stroke control cylinder 33 can be used which can be accommodated next to the two filter chambers 10A and 10B on the rotary valve housing 11.

The rotary valve housing 11 has an insert part 36 on the side opposite the sludge outlet 21 extending into the housing 11 from the outside and which insert part is detachably fastened with its flange by means of screws 37 on the rotary valve housing and which has a central bore for the rotary valve part to pass through. The approximately cup-shaped insert part 36 forms a pressure reservoir 38 on the inside of the rotary valve housing 11 which is connected by way of a connecting channel 39 to a ((not displayed) source of compressed air. The rotary valve 22 has a cylindrical extension 40 extending into the open end of the insert part 36, in which it is at this point rotatably mounted in the insert part. 0-gaskets 41 seal the pressure reservoir 38 against the inner bore of the rotary valve housing 11. The insert part 36 forms accordingly one pivot bearing of the rotary valve 22. A second mounting or pivot bearing of the rotary valve 22 is formed on the opposite side by a valve seat 42 integral with the rotary valve which engages in a bore 43 of the rotary valve housing 11. The pivot bearing 42, 43 constructed as a sleeve bearing has, the same as the other pivot bearing on the insert part 36, such a small clearance that the metallic sealing on the sealing surfaces 24 of the rotary valve 22 is assured.

A piston valve or a control piston 44 is arranged within and coaxially to the rotary valve 22 which control piston on its end facing the sludge outlet 21 carries a valve seat engaging element 45 consisting of a valve cone which cooperates with the valve seat 42. The piston valve 44 has a certain dead motion X relative to the valve element 45, so that it can move relative to the valve seat engaging element 45 in an axial direction by this stroke dimension. A nut 46 screwed on to the outer end of the piston valve 44 forms a stop for the valve element 45. The piston valve 44 carries a piston 47 on the opposite end which slides within a control cylinder 48 in sealing contact therewith. The control cylinder 48 is fastened on the rotary valve 22 by means of screws 49. The space or chamber 50 on the one side of the piston 47 is connected by boreholes 51, 52 of the insert part 36 and by way of a connection 53 with the said source of compressed air, whereas the space or chamber 54 on the opposite side of the piston 47 is joined by way of the radial channels or passageways 55 of the control cylinder 48 to the pressure reservoir 38. The control piston 44 has in the area between the piston 47 and the valve element 45 a shaft reduction 56 which passes through an axial borehole 57 of the rotary valve 22 of a larger diameter.

Figure 2:
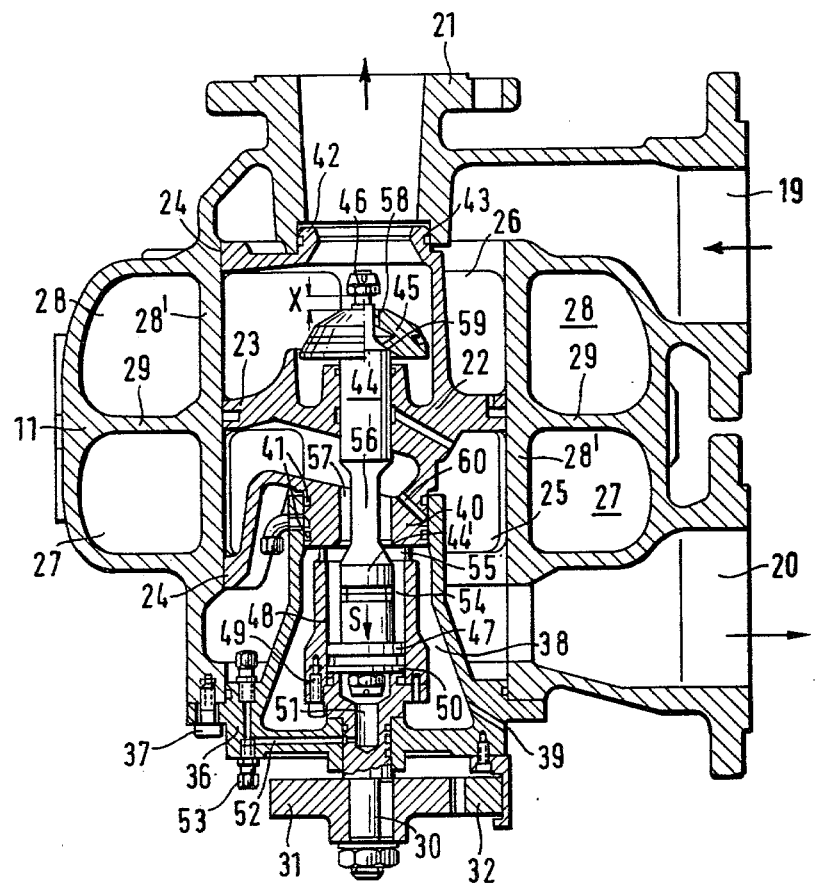
FIG. 2 is a cross-section following the line II—II of FIG. 1.

FIG. 2 shows the rotary valve 22 in a control position in which the filter chamber 10B is set for filtering operation and the filter chamber 10A for flush-back. The filtering operation takes place in the following way:

The liquid to be filtered is supplied over the connection 19 of the rotary valve housing 11. It flows through the ring channel 26 into the ascending channel 28 which empties into the mounting base 12 of the rotary valve housing 11 and is here in communication with the interior of the filter chamber 10B. The liquid flows inside the filter chamber 10B from the outside toward the inside through the filter cartridges 15 which, as is well known, each consist of a supporting body covered with a filtering tissue or the like. The dirt is in such a device deposited on the outer surface of the filter cartridges, while the filtered liquid flows through to the interior of the filter cartridges, the openings 17 of the support plate 16 and the channels 27, 25, to the outlet 20 for the filtrate.

The flush-back of the filter chamber 10A cut off from the circulation takes place in principle in the manner know from the DE-AS No. 18 01 441 application. In this operation pneumatic pressure in the compression chamber 50 of the cylinder 48 is reduced over the connecting boreholes 51,52, so that the control piston 44, by the pressure in the compression chamber 38 acting upon the smaller annular area of the piston in the cylinder space 54 is shifted in the direction of the arrow S. During this stroke movement of the piston valve 44, the valve element 45 remains first on the valve seat 42, since, as previously mentioned, the piston valve has a dead motion X relative to the valve element. Consequently, the sludge outlet 21 remains closed for the timebeing. The stroke motion of the piston valve 44 while the valve element 45 remains in closed position, opens, in a known manner, a passage 58 on the valve element 45 which is normally closed by a conical shoulder 59 of the piston valve 44. Thereby the annular space 26 is connected with the sludge discharge 21, so that unfiltered liquid can flow from the filter chamber 10A over the channels 28, 26, 58 into the sludge outlet 21. It is understood that hereby the channel 28 assigned to the filter chamber 10A is closed by the rotary valve 22 against the channel 28 of the other filter chamber 10B. The discharge of the liquid from the filter chamber 10A takes place by the action of a compressed air cushion which is located in the top space 18 of the filter chamber 10A. The air present here is with the preceding filling of the filter chamber 10A compressed in the top space 18. The liquid level in the filter chamber 10A falls in this initial phase of the stroke motion of the piston valve 44 from the normal level L during the filter operation to a level L1 which lies below the upper end of the filter cartridges 15. With the continuing stroke of the piston valve in the direction of the arrow S, the valve seat element 45 is carried along by striking the nut 46 and the sludge outlet on the connection 21 is in this way fully opened. After traveling a certain distance, control part 44' on the piston valve 44 opens suddenly the pressure medium passage 57, so that the compressed air present in the pressure reservoir 38 can escape in a sudden burst through the channels 55, 57, 25, 17 into the interior of the filter cartridges 15 and from here in counterflow over the channel 28 into the sludge outlet on the connection 21. It is understood that the rotary valve 22 in this control position connects the channel 28 of the filter chamber 19A with the sludge outlet, whereas it connects at the same time the channel 28 of the filter chamber 10B with the inlet 19 and shuts off against the sludge outlet as well as against the filtrate outlet.

The suddenly expanding compressed air accelerates movement of the liquid columns present within the filter cartridges and in the connecting channels leading to them. Since the liquid level has been previously lowered down to L1, an acceleration distance of about 10 to 100 mm is available between the upper area of the filter cartridges, i.e. between the level L1, and the upper head ends 15' of the filter cartridges, with the consequence that in case of a considerably reduced counterpressure, a sudden acceleration of the liquid columns is attained all the way into the upper head space 18 of the filter chamber by the action of which the mud deposits on the outer surfaces of the filter cartridges 15 are broken up and washed away. It has become evident that in this manner an extremely effective and, compared to the known filtering devices, considerably improved flushback action can be achieved. The sludge flows from the filter chamber 10A over the channel 28 and the connection 21 into the sludge outlet.

Figure 1:
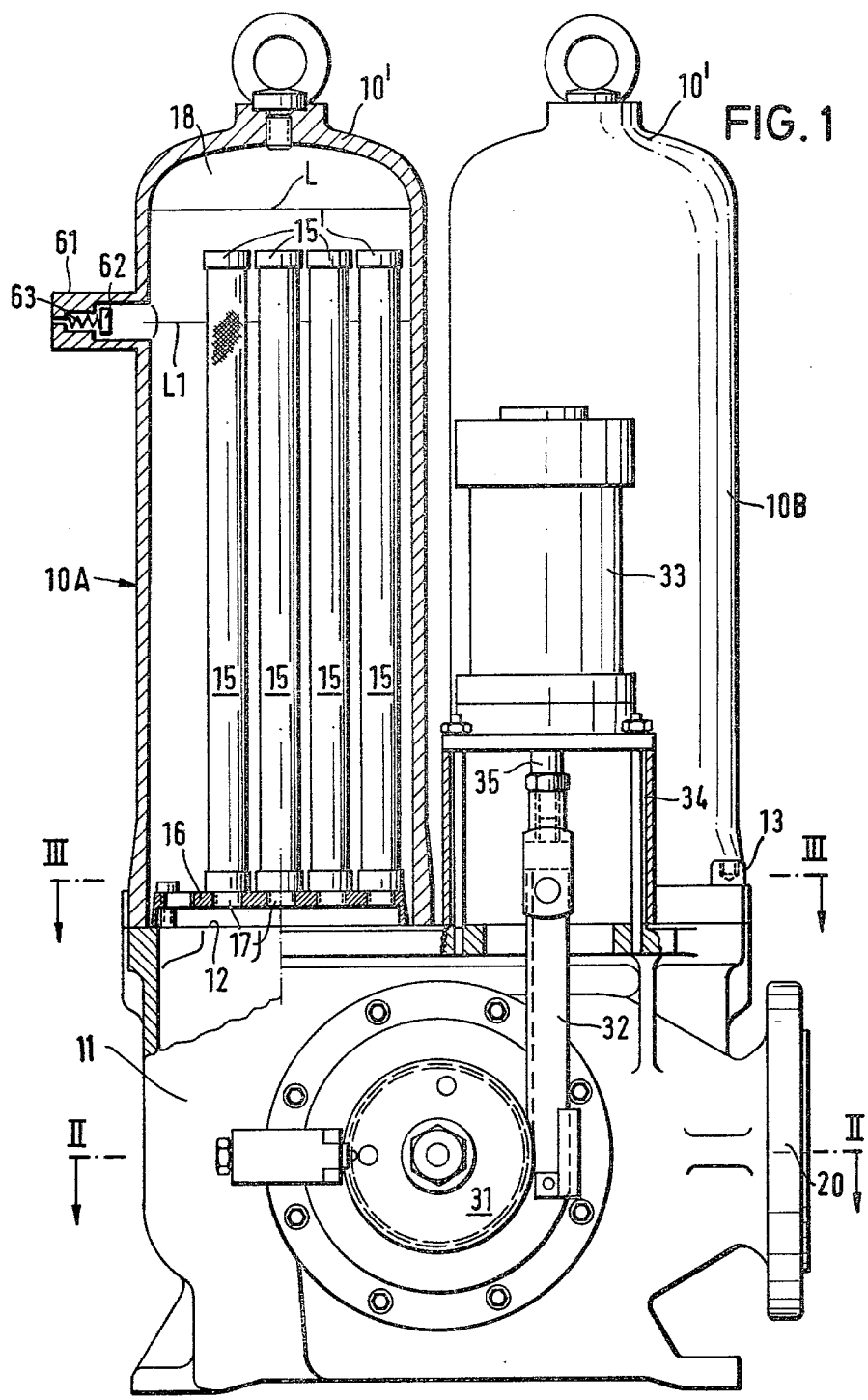
FIG. 1 shows a filter apparatus according to the invention in lateral view, partly in vertical section.

In the flush-back operation practically the entire liquid still remaining in the filter chamber 10A is driven out by the compressed air. After the flush-back cleaning, depending on the elapsed time and tripped by the control signal, the piston valve 44 is again changed over by compressed air being introduced into the cylinder space 50 through the pressure medium connection 51 to 53. With the stroke motion of the piston valve counter to the direction of the arrow S, the pressure medium passage 57 is first shut off by the control part 44' of the piston valve, whereby the pressure reservoir 38 is closed, so that the latter can again be charged with compressed air over the connection 39. With the return stroke of the piston valve 44, the valve closing element 45 comes again to rest on the valve seat 42, whereby the connection 21 to the sludge outlet is closed. At the same time the cone-shaped shoulder 59 of the piston valve again engages the corresponding seat surface on the valve closing element 45, so that the pressure medium pasage 57 is closed also. With the closing of the sludge discharge valve 42, 45, a channel 60 of the rotary valve 22 is connected through the annular space 26 and the connection 19 on the supply side of the filter apparatus to the filter chamber 10A, so that the latter is filled with liquid. The liquid rising in the filter chamber 10A expels the air through an air vent valve 61 whose valve element 62 is normally kept in open position (FIG. 1) by a spring 63. As soon as the liquid in the filter chamber 10A has risen up to the level L1 and thus up to the level of the air vent valve 61, the piston-like valve element 62 is promptly closed by the flow pressure of the liquid, so that the liquid can further rise in the filter chamber 10A. Hereby air which still remains in the head space 18 is compressed which compressed air then, as described above, with the later changeover of the filter chamber 10A to renewed flush-back expands until the level has dropped from L to L1.

As soon as the filter chamber 10A is filled up to the level L, the rotary valve 22 can by appropriate pressure charge of the control cylinder 33 again be changed over, so that now the filter chamber 10A is set for flush-back. In filter operation the filter chamber 10A is connectd on the intake side with the connection 19 by way of the rotary valve 22 and on the outlet side with the connection 20. The flush-back of the filter chamber 10B takes place in the described manner.

By this arrangement the now clean filter chamber is again filled up with liquid after the flush-back operation. This results in a pressure balance between the filter chamber and the outlet side of the filter apparatus on the connection 20, so that for the control action of the rotary slide 22 only relatively small operating forces are required.

The entire operation of the filter apparatus can be carried out completely automatically by making the changeover of the rotary valve as well as the control functions of the control piston 44 dependent on a control signal, for instance dependent on time, by appropriate control of the control cylinder 33.

From the drawing it can be recognized that the entire filter apparatus has a comparatively small overall height and overall width. The overall height of the rotary valve housing 11 forming the pedestal for the filter chamber is considerably smaller than that of the two filter chambers 10A and 10B. The overall width of the rotary valve housing 11 corresponds approximately to the total of the dimensions of the two filter chambers. It is furthermore recognizable that by virtue of the squat build, short hydraulic paths are made possible between the filter chambers and the connections 19 to 21, so that also the internal pressure losses of the filter apparatus are relatively small.

The invention has been described with reference to a preferred embodiment. Obviously, modifications and alterations will occur to others upon a reading and understanding of this specification, and it is my intention to include all such modifications and alterations insofar as they come within the scope of the appended claims.

What is claimed is:

1. In a filter apparatus comprised of: a pair of filter element chambers; a valve housing having an inlet port, an outlet port, a sludge outlet port and a plurality of filter housing inlet and outlet openings; a rotary valve member in said housing and arranged to selectively interconnect said ports with said openings through internal passages in said valve housing, the improvements which comprise: said valve housing having an upwardly facing surface in which said openings are located; said surface forming a common mounting base for said pair of filter element chambers; said chambers having generally vertically extending axis; said valve member having a generally horizontal axis of rotation perpendicular to said vertical axes, and said inlet and outlet ports and said sludge outlet port all being located in a common horizontal plane.

2. Filter apparatus according to claim 1 wherein said inlet and outlet ports lie next to each other in said common horizontal plane.

3. Filter apparatus according to claim 1 wherein said two filter chambers each have an approximately elliptical or oval cross-section, and are arranged on the valve housing in side-by-side relationship in such a way that the longitudinal axes of the elliptical or oval cross-sections are parallel with each other.

4. Filter apparatus according to claim 1 wherein on the top surface of the valve housing laterally to the filter chambers is arranged a control cylinder for switching over the rotary valve.

5. Filter apparatus according to claim 4 wherein the control cylinder is coupled by means of a rack-and-pinion gear with the rotary valve.

6. Filter apparatus according to claim 1 wherein the filter chambers are provided with a group of parallel filter cartridges, and air-vent valves are arranged at a distance underneath the upper ends of the filter cartridges.

7. Filter apparatus according to claim 1 wherein said rotary valve member has a valve seat integrally formed thereon communicating with said sludge outlet port and a reciprocable valve member in said rotary valve member movable into closing relationship with said valve seat.

8. Filter apparatus according to claim 1 wherein an insert port extends into the side of the rotary valve housing opposite the sludge outlet port, said port forming a pressure reservoir for a pneumatic flush back medium, said valve member having a cylindrical space communicating said reservoir with one of said internal passages and a plunger on a control piston selectively movable into and out of said cylindrical space for selectively communicating pressures in said reservoir with said internal passages.

9. Filter apparatus according to claim 8 wherein the rotary valve is rotatably mounted in the insert piece.

* * * * *